United States Patent
Qu et al.

(10) Patent No.: US 12,292,642 B2
(45) Date of Patent: May 6, 2025

(54) DISPLAY PANEL AND MANUFACTURING METHOD THEREFOR, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Yingying Qu, Beijing (CN); Lingdan Bo, Beijing (CN); Ting Dong, Beijing (CN); Jianhua Huang, Beijing (CN); Qiujie Su, Beijing (CN); Dongchuan Chen, Beijing (CN); Yanping Liao, Beijing (CN); Seungmin Lee, Beijing (CN); Jiantao Liu, Beijing (CN); Yue Yang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/788,222

(22) PCT Filed: Sep. 17, 2021

(86) PCT No.: PCT/CN2021/119020
§ 371 (c)(1),
(2) Date: Jun. 22, 2022

(87) PCT Pub. No.: WO2023/039823
PCT Pub. Date: Mar. 23, 2023

(65) Prior Publication Data
US 2024/0168326 A1 May 23, 2024

(51) Int. Cl.
*G02F 1/1335* (2006.01)
*G02F 1/1333* (2006.01)
*G02F 1/1368* (2006.01)

(52) U.S. Cl.
CPC .. *G02F 1/133514* (2013.01); *G02F 1/133302* (2021.01); *G02F 1/133512* (2013.01); *G02F 1/1368* (2013.01)

(58) Field of Classification Search
CPC ......... G02F 1/133514; G02F 1/133302; G02F 1/133512; G02F 1/1368
(Continued)

(56) References Cited

U.S. PATENT DOCUMENTS 5,680,187 A   10/1997  Nagayama et al.
2013/0101755 A1*  4/2013  Lee ............... G02F 1/133707
                                                        427/532
(Continued)

FOREIGN PATENT DOCUMENTS

CN       1119743 A     4/1996
CN     201628832 U    11/2010
(Continued)

OTHER PUBLICATIONS

Office Action dated Oct. 25, 2024, issued in counterpart CN Application No. 202180002603.3, with English translation. (15 pages).

*Primary Examiner* — Michael H Caley
*Assistant Examiner* — William D Peterson
(74) *Attorney, Agent, or Firm* — WHDA, LLP (57) ABSTRACT

The present disclosure provides a display panel and a manufacturing method therefor, and a display apparatus, which relate to the technical field of displaying. The display panel includes a first base plate and a second base plate which are aligned with each other; the first base plate includes a first substrate and a thin film transistor; the thin film transistor includes an active layer; an optical adjustment layer is disposed on the second base plate; an orthographic projection of the optical adjustment layer on the first substrate overlaps with an orthographic projection of the active layer on the first substrate. That is, the optical adjustment layer corresponds to the active layer. In a laminating direction of the display panel, the existence of the optical adjustment layer with a certain height enables a reflecting surface of the second base plate to be closer to the first base plate.

18 Claims, 9 Drawing Sheets

(58) Field of Classification Search
USPC .......................................................... 257/72
See application file for complete search history.

(56) References Cited

U.S. PATENT DOCUMENTS

| | | | |
|---|---|---|---|
| 2017/0031488 A1* | 2/2017 | Shim | ........................ G06F 3/044 |
| 2020/0033659 A1 | 1/2020 | Um et al. | |
| 2020/0209679 A1 | 7/2020 | Ling et al. | |

FOREIGN PATENT DOCUMENTS

| | | |
|---|---|---|
| CN | 108803179 A | 11/2018 |
| CN | 109447046 A | 3/2019 |
| CN | 209118015 U | 7/2019 |
| CN | 111223878 A | 6/2020 |
| KR | 19980078722 A | 11/1998 |
| KR | 20080057433 A | 6/2008 |
| KR | 20190063190 A | 6/2019 |

* cited by examiner

R mask          G mask          B mask

FIG. 9

R mask        G mask        B mask

FIG. 10

DISPLAY PANEL AND MANUFACTURING METHOD THEREFOR, AND DISPLAY APPARATUS

TECHNICAL FIELD

The present disclosure relates to the technical field of displaying and, more particularly, to a display panel and a manufacturing method therefor, and a display apparatus.

BACKGROUND

Nowadays, in the research and development of display products, in addition to pursuing a larger size, higher response speed and higher resolution, contrast and transmittance, it is also very urgent to improve the quality of a display image. However, due to the limitation of a display mode, a driving method and other reasons, the defect of a display image is still one of the problems that need to be paid attention to in liquid crystal displaying. A Thin Film Transistor (TFT), as a display control switch, plays a key role in liquid crystal displaying. The Ioff performance of the TFT can directly affect the quality of the display image, and a decline of Ioff will bring image quality problems such as Crosstalk and Flicker.

SUMMARY

The present disclosure provides a display panel, including a first base plate and a second base plate which are aligned with each other, wherein the first base plate includes a first substrate and a TFT; the TFT includes an active layer; the second base plate includes a second substrate;

an optical adjustment layer is arranged on the second base plate; the optical adjustment layer is located between the second substrate and the first base plate; an orthographic projection of the optical adjustment layer on the first substrate overlaps with an orthographic projection of the active layer on the first substrate; and a surface of the first base plate close to the optical adjustment layer is a first surface; in a region of the second base plate that is not provided with the optical adjustment layer, a surface of the second base plate close to the first base plate is a second surface; in a laminating direction of the display panel, a height between the first surface and the second surface is a target height of the display panel; and a ratio of a height of the optical adjustment layer to the target height is greater than 40%.

Optionally, a transmittance of the optical adjustment layer is greater than or equal to 5% and less than or equal to 70%.

Optionally, the second base plate includes a second substrate, the optical adjustment layer is located between the second substrate and the first base plate.

Optionally, the second base plate further includes a black matrix layer and a color filter layer; the black matrix layer and the color filter layer are located on one side of the second substrate close to the first base plate; and the optical adjustment layer is located on one side of the black matrix layer away from the second substrate.

Optionally, an orthographic projection of the color filter layer on the second substrate and an orthographic projection of the black matrix layer on the second substrate have an overlapping region; and the optical adjustment layer is located in the overlapping region.

Optionally, in the overlapping region, the color filter layer is located between the black matrix layer and the optical adjustment layer.

Optionally, in the overlapping region, the optical adjustment layer is located between the black matrix layer and the color filter layer.

Optionally, an orthographic projection of the color filter layer on the second substrate does not overlap with an orthographic projection of the black matrix layer on the second substrate; and the optical adjustment layer is disposed on one side of the black matrix layer away from the second substrate.

Optionally, the first base plate includes a black matrix layer and a color filter layer; and the optical adjustment layer is disposed on one side of the second substrate close to the first base plate.

Optionally, on a plane parallel to the first substrate, a ratio of an outer diameter of the optical adjustment layer to an outer diameter of the active layer is greater than 50%.

Optionally, a material of the optical adjustment layer includes a color filter material.

Optionally, the display panel includes a plurality of pixel structures; and in a same pixel structure, the color filter layer and the optical adjustment layer adopt color filter materials in different colors.

Optionally, wherein in the laminating direction of the display panel, the height of the optical adjustment layer is greater than or equal to 1 µm and less than or equal to 2.6 µm.

The present disclosure further provides a method for manufacturing a display panel, which is used for manufacturing the display panel according to any one of claims 1 to 12, and the method includes:

providing a first substrate;

forming a TFT on the first substrate to obtain a first base plate, the TFT including an active layer;

forming a second base plate and an optical adjustment layer;

aligning the first base plate and the second base plate to obtain a display panel;

wherein an orthographic projection of the optical adjustment layer on the first substrate overlaps with an orthographic projection of the active layer on the first substrate; a surface of the first base plate close to the optical adjustment layer is a first surface; in a region of the second base plate that is not provided with the optical adjustment layer, a surface of the second base plate close to the first base plate is a second surface; in a laminating direction of the display panel, a height between the first surface and the second surface is a target height of the display panel; and a ratio of a height of the optical adjustment layer to the target height is greater than 40%.

Optionally, the step of forming the second base plate and the optical adjustment layer includes:

providing a second substrate;

forming a black matrix layer on the second substrate; and forming a color filter layer and an optical adjustment layer through a masking process, the color filter layer being disposed on the second substrate having the black matrix layer, and the optical adjustment layer being disposed on one side of the black matrix layer away from the second substrate.

Optionally, a material of the optical adjustment layer includes a color filter material; the display panel includes a plurality of pixel regions; the plurality of pixel regions are used for disposing pixel structures in at least two colors;

the step of forming a color filter layer and an optical adjustment process through a masking process includes:

forming, through one mask, a color filter layer in the pixel regions used for disposing pixel structures in one color, and forming an optical adjustment layer in the pixel regions used for disposing pixel structures in at least one other color at a same time.

The present disclosure further provides a display apparatus, including the above-mentioned display panel.

The foregoing description is only a summary of the technical solutions of the present disclosure. To know the technical measures of the present disclosure more clearly, the technical solutions can be implemented in accordance with the content of the specification, and to make the foregoing and other objectives, features and advantages of the present disclosure more understandable, specific implementation modes of the present disclosure are exemplified below.

BRIEF DESCRIPTION OF THE DRAWINGS

To describe the embodiments of the present disclosure or the technical solutions in the related art more clearly, drawings required to be used in the embodiments or the illustration of the related art will be briefly introduced below. Obviously, the drawings in the illustration below are some embodiments of the present disclosure. Those ordinarily skilled in the art also can acquire other drawings according to the provided drawings without doing creative work.

DETAILED DESCRIPTION OF THE EMBODIMENTS

In order to make the objectives, technical solutions and advantages of the embodiments of the present disclosure clearer, the technical solutions in the embodiments of the present disclosure will be described clearly and completely below in combination with the drawings in the embodiments of the present disclosure. Obviously, the embodiments described herein are part of the embodiments of the present disclosure, not all the embodiments. Based on the embodiments in the present disclosure, all other embodiments obtained by those of ordinary skill in the art without creative work shall fall within the protection scope of the present disclosure.

Unless otherwise defined, technical terms or scientific terms used in the present disclosure shall be ordinary meanings as understood by those of ordinary skill in the art of the present disclosure. The words "first", "second" and similar terms used in the present disclosure do not denote any order, quantity or importance, but are merely used to distinguish different components. Likewise, words such as "one" "a/an" or "the" do not denote a limitation of quantity, but rather denote the presence of at least one. The word "including" or "includes" or the like means that the element or item preceding the word covers the element or object listed after the word and its equivalent, without excluding other elements or objects. The words "connection" or "connected" and the like are not limited to physical or mechanical connections, but may include electrical connections, whether direct or indirect. Position words "upper", "lower", "left", "right" and the like are only used to denote relative position relations based on the accompanying drawings. After an absolute position of a described object changes, the relative position relation may also change correspondingly.

At present, in display products, especially some high-resolution display products (such as 4K, 8K or higher-resolution display products), new challenges are brought to the design of display panels, but at the same time, the requirements for the quality of images have not been lowered. With the improvement of the resolution, the brightness of backlight increases and can currently reach 20,000 nits, which not only brings high brightness to a display panel, but also brings certain negative effects, such as causing the Ioff of a TFT component in the display panel to decrease. The decrease of the Ioff will change the characteristics of the display panel and deteriorate the image quality.

Figure 1:
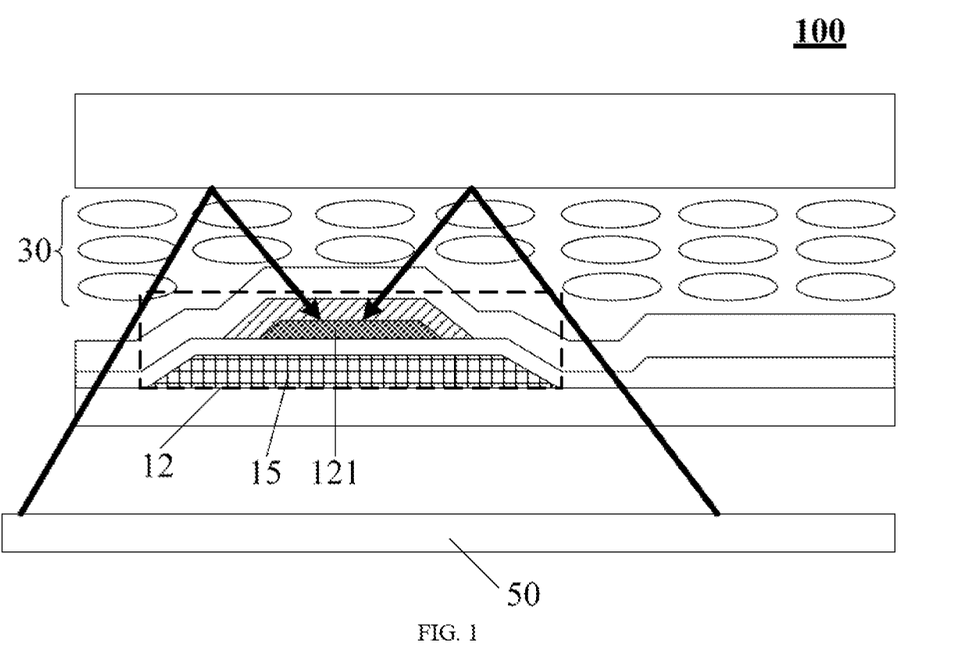
FIG. 1 illustrates a partially sectional diagram of an existing display panel.

The TFT component is relatively sensitive to light, and light irradiation will deteriorate the characteristics of the TFT component. When a Liquid Crystal Display (LCD) panel is in normal displaying, no matter it is black or white, a backlight module is always on. In a High-Dynamic Range (HDR) display mode, the backlight module is partially on. Referring to FIG. 1, light which is emitted by a backlight module 50 and is perpendicular to the display panel 100 will not have a negative impact on a TFT component 12 due to shielding of a grid metal layer 15 below the position of the TFT component 12. Therefore, light directly radiating from below does not irradiate a channel of the TFT component 12.

However, the direction of the light emitted by the backlight module 50 is not completely collimated. Therefore, there will be backlight light entering from a lateral side of the TFT, which will be reflected by a surface of a structure above a liquid crystal layer 30 after passing through the liquid crystal layer 30 and irradiate the channel of the TFT component 12, as shown in FIG. 1. There is an active layer 121 below the channel of the TFT component 12. A commonly used material of the active layer 121 is a hydrogenated amorphous silicon material a-Si:H. This material is widely used in TFT components due to its larger switch ratio and lower Ioff. When the material is exposed to light, carriers will become more active and the conduction rate will be increased, so the Ioff of the TFT component will decrease faster, which will bring problems of poor image displaying such as Crosstalk and Flicker.

Figure 2:
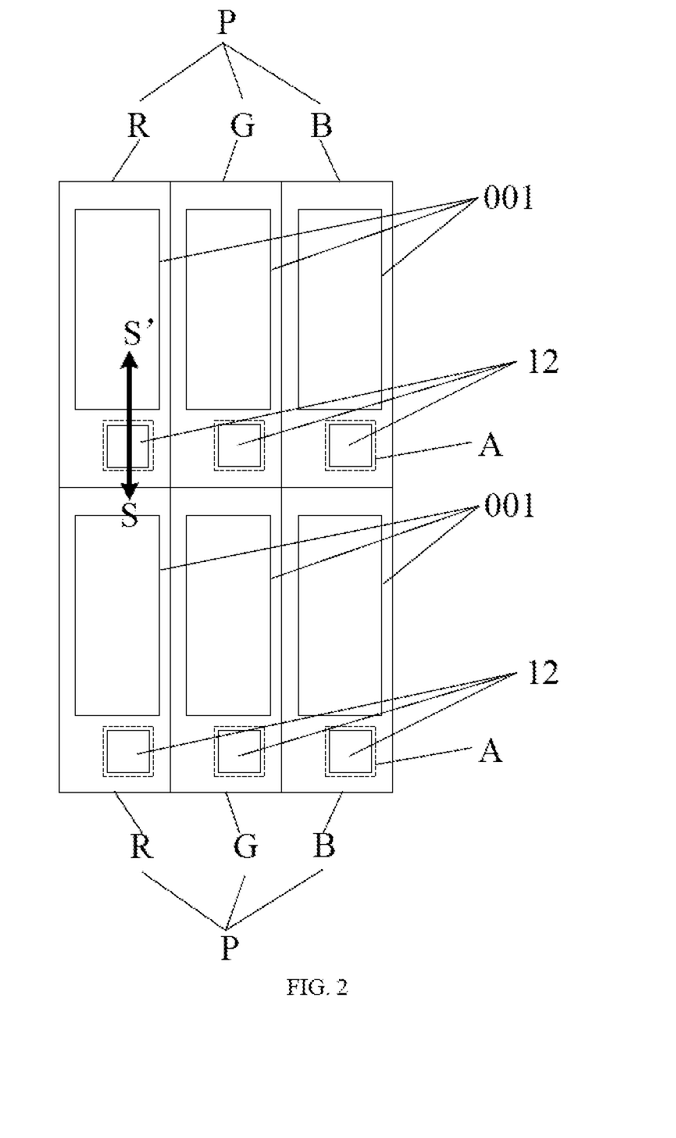
FIG. 2 illustrates a partial top view of a display panel according to an embodiment of the present disclosure.

FIG. 2 illustrates a partial top view of a display panel according to an embodiment of the present disclosure, and FIG. 3, FIG. 4, FIG. 5 and FIG. 6 respectively illustrate four longitudinal sectional views of SS' in FIG. 1. Referring to FIG. 3 to FIG. 6, the display panel 100 includes a first base plate 10 and a second base plate 20 which are aligned with each other. A liquid crystal layer 30 is disposed between the first base plate 10 and the second base plate 20. The first base plate 10 includes a first substrate 11 and a TFT 12. The TFT 12 includes an active layer 121. The second base plate 20 includes a second substrate 21.

An optical adjustment layer 40 is arranged on the second base plate 20. The optical adjustment layer 40 is located between the second substrate 21 and the first base plate 10. An orthographic projection of the optical adjustment layer 40 on the first substrate 11 overlaps with an orthographic projection of the active layer 121 on the first substrate 11.

A surface of the first base plate 10 close to the optical adjustment layer 40 is a first surface Q1. In a region of the second base plate 20 that is not provided with the optical adjustment layer 40, a surface of the second base plate 20 close to the first base plate 10 is a second surface Q2; a height between the first surface Q1 and the second surface Q2 is a target height h2 in a laminating direction D of the display panel 100; and a ratio of a height h1 of the optical adjustment layer 40 to the target height h2 is greater than 40%.

In specific applications, in order to reduce the backlight light reflected to the active layer 121 as much as possible, the height h1 of the optical adjustment layer 40 may be set to be slightly less than the target height h2.

In FIG. 2, 001 is a valid pixel luminous region.

Optionally, a transmittance of the optical adjustment layer 40 is greater than or equal to 5% and less than or equal to 70%.

Specifically, in one optional implementation, the transmittance of the optical adjustment layer 40 may be greater than or equal to 5% and less than 20%.

In another optional implementation, the transmittance of the optical adjustment layer 40 may be greater than or equal to 20% and less than or equal to 50%. In practical application, this implementation can be used as a preferable implementation.

In yet another optional implementation, the transmittance of the optical adjustment layer 40 may be greater than 50% and less than or equal to 70%.

It should be noted that the transmittance of the above-mentioned optical adjustment layer 40 refers to an overall transmittance of the optical adjustment layer 40, rather than a transmittance for a certain kind of single-color light.

As shown in FIG. 3 to FIG. 6, the optical adjustment layer 40 corresponds to the active layer 121. The optical adjustment layer has a low transmittance. The optical adjustment layer 40 is located between the second substrate 21 and the first base plate 10. Furthermore, in a laminating direction D of the display panel 100, the existence of the optical adjustment layer 40 with a certain height enables a reflecting surface above the liquid crystal layer 30 to be closer to the first base plate 10, so that it is hard for backlight light entering from a lateral side of the TFT 12 to reach the reflecting surface, and then the backlight light cannot be reflected to the active layer 121. As such, a great decline in Ioff of the TFT 12 is avoided, and the image quality is improved.

Optionally, the display panel 100 may be a display panel in an Advanced Super Dimension Switch (ADS) liquid crystal mode, a Twisted Nematic (TN) liquid crystal mode, an In-Plane Switching (IPS) liquid crystal mode, or a Vertical Alignment (VA) liquid crystal mode, which is not specifically limited in this embodiment of the present disclosure.

In specific applications, in order to reduce the backlight light reflected to the active layer 121 as much as possible, the height h2 of the optical adjustment layer 40 may be set to be slightly less than the target height h1.

In actual design, the height h1 of the optical adjustment layer 40 may be specifically designed to be greater than or equal to 1.2 µm and less than or equal to 2.4 µm. In practical applications, considering a tolerance (which is usually 0.2 µm) in a preparing process, in the actually manufactured display panel 100, in the laminating direction D of the display panel 100, the height h1 of the optical adjustment layer 40 may be specifically greater than or equal to 1 µm and less than or equal to 2.6 µm.

Specifically, in one optional implementation, in the laminating direction D of the display panel 100, the height h1 of the optical adjustment layer 40 may be specifically greater than or equal to 1 µm and less than 1.6 µm.

In another optional implementation, in the laminating direction D of the display panel 100, the height h1 of the optical adjustment layer 40 may be specifically greater than or equal to 1.6 µm and less than or equal to 2.2 µm. In practical application, this implementation can be used as a preferable implementation.

In yet another optional implementation, in the laminating direction D of the display panel 100, the height h1 of the optical adjustment layer 40 may be specifically greater than 2.2 µm and less than or equal to 2.6 µm.

It should be noted that the specific range of the height h1 of the above optical adjustment layer 40 is only an optional example, which does not constitute a limitation to the present disclosure.

Optionally, in one implementation, the display panel 100 may specifically be a non-Color Filter on Array (COA) display panel, that is, the first base plate 10 is an array substrate, and the second base plate 20 is a color film base plate.

Figure 3:
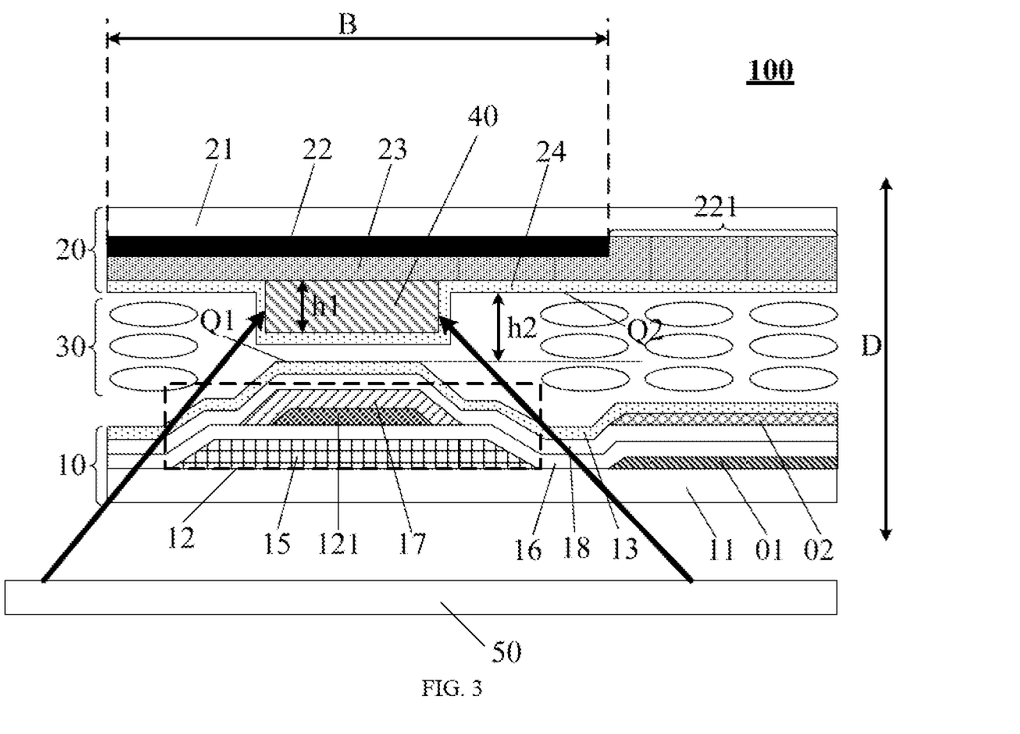
FIG. 3 illustrates a partially sectional view of a display panel according to an embodiment of the present disclosure.
Figure 4:
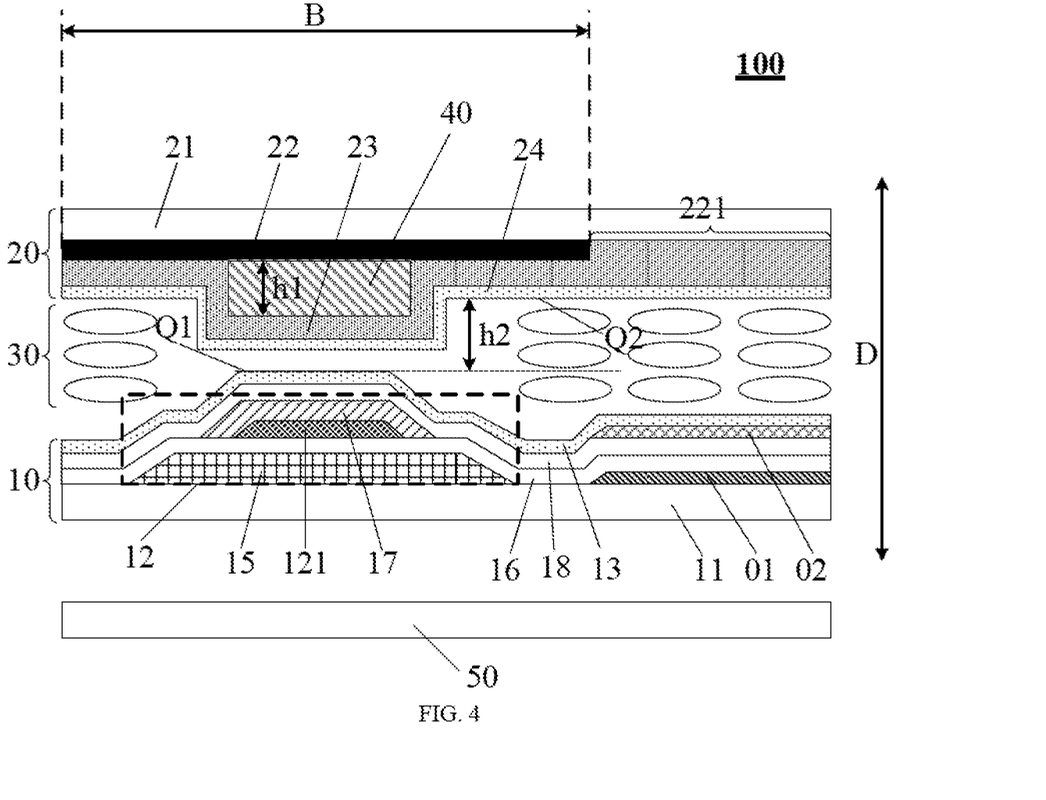
FIG. 4 illustrates a partially sectional view of another display panel according to an embodiment of the present disclosure.
Figure 5:
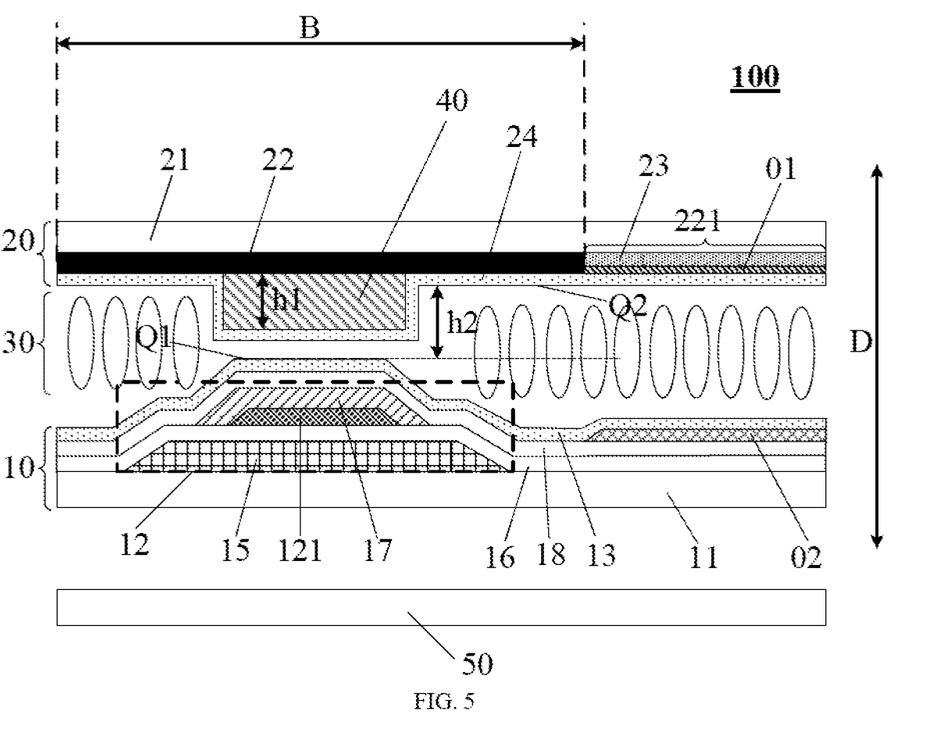
FIG. 5 illustrates a partially sectional view of a third kind of display panel according to an embodiment of the present disclosure.

For this implementation, referring to FIG. 3 to FIG. 5, the second base plate 20 further includes a black matrix layer 22 and a color filter layer 23. The black matrix layer 22 and the color filter layer 23 are located on one side of the second substrate 21 close to the first base plate 10. The black matrix layer 22 is provided with a pixel opening 221. The color filter layer 23 is at least partially located in the pixel opening 221. Optionally, the optical adjustment layer 40 is located on one side of the black matrix layer 22 away from the second substrate.

In the non-COA display panel, the optical adjustment layer 40 may be disposed between the black matrix layer 22 and the first base plate 10.

Further optionally, referring to FIG. 3 to FIG. 4, an orthographic projection of the color filter layer 23 on the second substrate 21 and an orthographic projection of the black matrix layer 22 on the second substrate 21 have an overlapping region B, and the optical adjustment layer 40 may be located in the overlapping region B.

In a more specific implementation, optionally, referring to FIG. 3, in the overlapping region B, the color filter layer 22 may be located between the black matrix layer 23 and the optical adjustment layer 40.

In another more specific embodiment, optionally, referring to FIG. 4, in the overlapping region B, the optical adjustment layer 40 may be located between the black matrix layer 23 and the color filter layer 22.

In the case where the orthographic projection of the color filter layer 23 on the second substrate 21 and the orthographic projection of the black matrix layer 22 on the second substrate 21 have an overlapping region B, it may be that the color filter layer 22 is closer to the black matrix layer 23 or the optical adjustment layer 40 is closer to the black matrix layer 23, which depends on an order in which the color filter layer 22 and the optical adjustment layer 40 are formed.

Optionally, referring to FIG. 5, the orthographic projection of the color filter layer 23 on the second substrate 21 and the orthographic projection of the black matrix layer 22 on the second substrate 21 do not have an overlapping region, and the optical adjustment layer 40 may be disposed on one side of the black matrix layer 22 away from the second substrate 21.

In the case where the orthographic projection of the color filter layer 23 on the second substrate 21 and the orthographic projection of the black matrix layer 22 on the second substrate 21 do not have an overlapping region, the optical adjustment layer 40 may be directly disposed on the black matrix layer 22.

Optionally, in another implementation, the display panel 100 may be specifically a COA display panel. That is, the first base plate 10 is a COA base plate. The black matrix layer 22 and the color filter layer 23 are disposed on the first base plate 10. No black matrix layer and no color filter layer are disposed on the second base plate 20. Optionally, in the COA display panel, the black matrix layer 22 may be formed by laminating a red color filter and a blue color filter.

Figure 6:
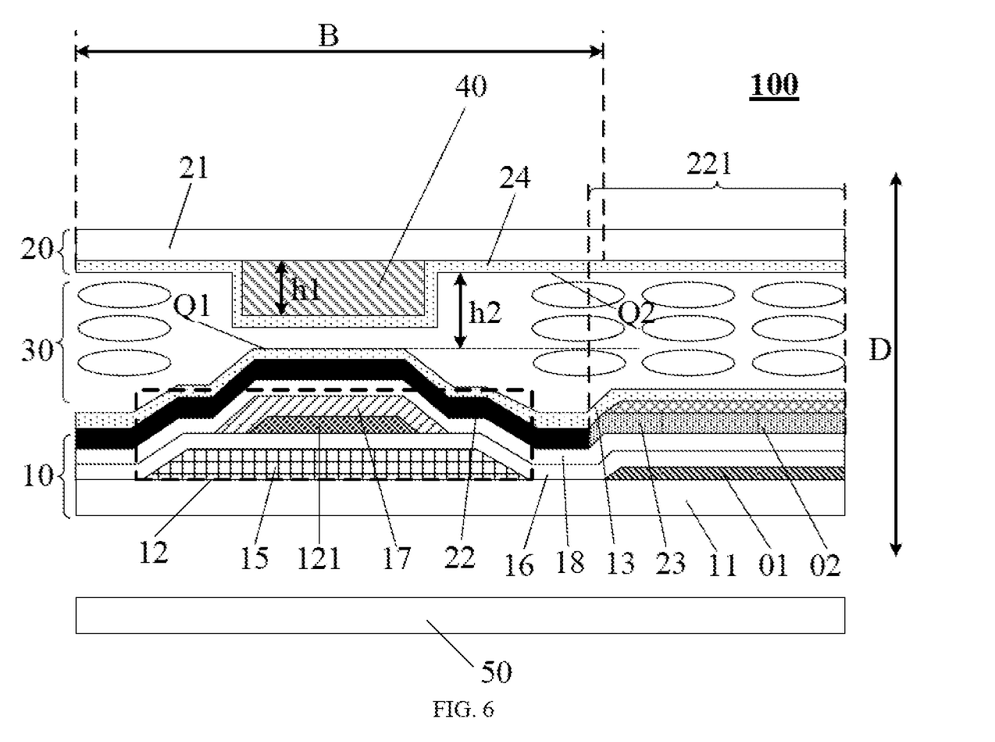
FIG. 6 illustrates a partially sectional view of a fourth kind of display panel according to an embodiment of the present disclosure.

Referring to FIG. 6, in the COA display panel, the first base plate 10 includes a black matrix layer 22 and a color filter layer 23. Optionally, the optical adjustment layer 40 may be disposed on one side of the second substrate 21 close to the first base plate 10.

Referring to FIG. 6, in the COA display panel, no black matrix layer and no color filter layer are disposed on the second base plate 20, and the optical adjustment layer 40 may be directly disposed on the second substrate 21.

Optionally, on a plane parallel to the first substrate 11, a ratio of an outer diameter of the optical adjustment layer 40 to an outer diameter of the active layer 121 is greater than 50%.

Specifically, on the plane parallel to the first substrate 11, the shapes of the optical adjustment layer 40 and the active layer 121 may be rectangular. Correspondingly, the outer diameter dimensions of the optical adjustment layer 40 and the active layer 121 may specifically include lengths and widths. That is, a ratio of the length of the optical adjustment layer 40 to the length a of the active layer 121 is greater than 50%, and a ratio of the width of the optical adjustment layer 40 to the width b of the active layer 121 is greater than 50%. In specific applications, the outer diameter dimension of the optical adjustment layer 40 may be slightly greater than the outer diameter dimension of the active layer 121.

The outer diameter dimension of the optical adjustment layer 40 can be determined according to the outer diameter dimensions of the active layers of different display panels. Based on the outer diameter dimension of the active layer, an increasing amount around the outer diameter dimension should not be less than an alignment deviation, so that the outer diameter dimension of the optical adjustment layer 40 can be obtained. The specific outer diameter dimension of the optical adjustment layer 40 is related to an actual display panel and a processing for manufacturing the display panel. For example, if the outer diameter dimension of the active layer of a certain display panel is (a*b) µm, and the alignment deviation is c microns (usually 2 µm), the outer diameter dimension of the optical adjustment layer 40 should be greater than (0.5a+2c)*(0.5b+2c).

In one optional specific implementation, if the active layer 121 may have a length of 17 µm and a width of 14 µm, the optical adjustment layer 40 may have a length of 28±2 µm and a width of 25±2 µm.

It should be noted that the specific ranges of the length and width of the above optical adjustment layer 40 are only optional examples, which do not constitute a limitation to the present disclosure.

Optionally, a material of the optical adjustment layer 40 includes a color filter material, such as at least one of a red color filter material, a green color filter material, and a blue color filter material.

Figure 7:
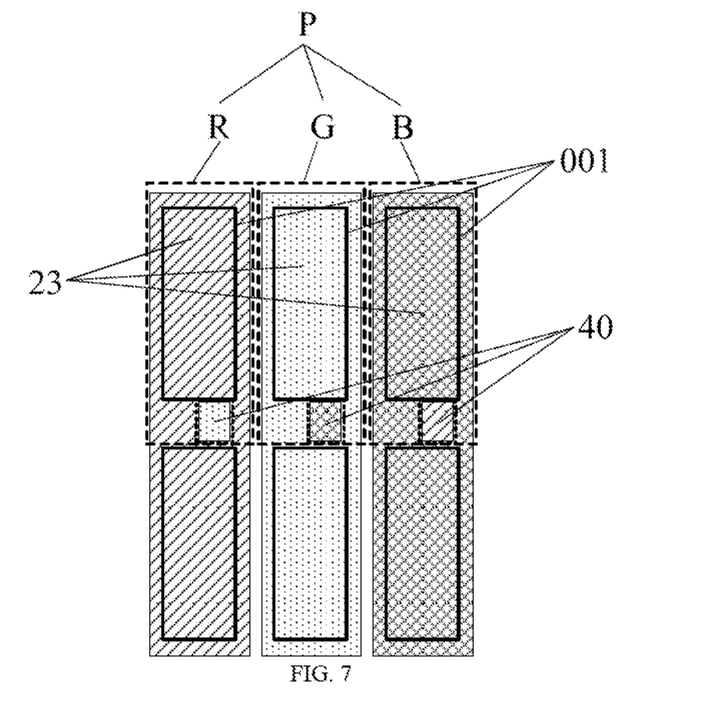
FIG. 7 illustrates a schematic diagram of a pixel structure of a display panel according to an embodiment of the present disclosure.

Further optionally, referring to FIG. 7, on a plane parallel to the first substrate 11, the display panel 100 includes a plurality of pixel structures P. The plurality of pixel structures P may specifically include a plurality of R (red) pixel structures, a plurality of G (green) pixel structures and a plurality of B (blue) pixel structures. In the same pixel structure P, the color filter layer 23 and the optical adjustment layer 40 may use color filter materials in different colors.

Specifically, in one pixel structure P, if the color filter layer 23 uses a red color filter material, the optical adjustment layer 40 may use a green or blue color filter material; if the color filter layer 23 uses a green color filter material, the optical adjustment layer 40 may use a red or blue color filter material; and if the color filter layer 23 uses a blue color filter material, the optical adjustment layer 40 may use a red or green color filter material. It should be noted that FIG. 7 is only an optional example, and does not constitute a limitation to the present disclosure.

For example, in a pixel unit including an R pixel structure, a G pixel structure and a B pixel structure disposed in sequence along a row direction, the color filter layer 23 is sequentially an R color filter, a G color filter and a B color filter along the row direction, and the optical adjustment layer 40 is sequentially a G color filter, a B color filter and an R color filter along the row direction, as shown in FIG. 7.

For another example, in the above pixel unit, the color filter layer 23 is sequentially an R color filter, a G color filter and a B color filter along the row direction, and the optical adjustment layer 40 is sequentially a G color filter, an R color filter and an R color filter along the row direction. In the pixel unit of this example, the color filter materials of the optical adjustment layers of two adjacent pixel structures have the same color.

It should also be noted that in practical applications, the color filter layers 23 of adjacent pixel structures in the same color can be prepared through a mask patterned opening. Therefore, the color filter layers 23 of adjacent pixel structures in the same color may be of an integrated structure.

In practical applications, optionally, the integrated structure of the color filter layers obtained through one mask patterned opening can be an integrated structure that is continuous in a column direction (as shown in FIG. 7), or can be an integrated structure that is continuous in the row direction. Of course, it can also be an integral structure that is continuous in both the column direction and the row direction. The direction where the integrated structure of the color filter layers is continuous is related to the color arrangement design of the pixel structures, which is not specifically limited in the embodiment of the present disclosure.

For the COA display panel, if the optical adjustment layer 40 uses a color filter material, the optical adjustment layer 40 can be formed with the color filter layer 23 at a same time by using a masking process of the color filter layer 23 during the preparation. Color filter portions of the color filter layer 23 and the optical adjustment layer 40 that have the same color can be formed by one mask.

In addition, referring to FIG. 3 to FIG. 6, the second base plate 20 further includes a first orientation layer 24. The first orientation layer 24 and a second orientation layer 13 on the first base plate 10 can achieve orientation of the liquid crystal layer 30. The first orientation layer 24 may cover various structures including the optical adjustment layer 40 on the second base plate 20. In practical applications, an orientation layer may usually adopt an organic material Polyimide (PI). The PI material may enable the orientation layer to have certain flowability during preparation. Therefore, the first orientation layer 24 has good flexibility, so that the first orientation layer 24 may not be easily broken under the impact of the height of the optical adjustment layer 40.

In addition, the display panel 100 may further include a common electrode 01 and a pixel electrode 02. The pixel electrode 02 may be disposed on the first base plate 10. Referring to FIG. 3, in some embodiments, the common electrode 01 may also be disposed on the first base plate 10. Referring to FIG. 5, in some other embodiments, the common electrode 01 may be disposed on the second base plate 20. The common electrode 01 and the pixel electrode 02 are used for forming an electric field for controlling the liquid crystal layer 30. Therefore, the arrangement positions of the common electrode 01 and the pixel electrode 02 are related to a liquid crystal mode of the display panel 100.

Referring to FIG. 3 to FIG. 6, the first base plate 10 may further include a grid metal layer 15 (a grid electrode of the TFT 12), a grid insulation layer 16, and a source-drain metal layer 17 (a source electrode and a drain electrode of the TFT 12), a passivation layer 18 and other structures. Of course, the above-mentioned structure and positional relationship are only one optional example, and do not constitute a limitation to the present disclosure. For example, in practical applications, the first base plate 10 may also include a buffer layer, and a spacer may also be included between the first base plate 10 and the second base plate 20, which is not specifically limited in the embodiment of the present disclosure.

The inventors conducted the TFT Ioff detection on the existing display panel without an optical adjustment layer (hereinafter referred to as Sample 1) and the display panel with an optical adjustment layer provided in the embodiment of the present disclosure (hereinafter referred to as Sample 2). When the brightness of the backlight module is 10,000 nit, the Ioff of the TFT of Sample 1 is about 75 pA. For Sample 2, when the backlight light passes through the optical adjustment layer, the backlight brightness is about 500 nit, and the Ioff of the TFT of Sample 2 can be reduced to 10 pA.

In the embodiment of the present disclosure, an optical adjustment layer is disposed on the second base plate, and the optical adjustment layer corresponds to the active layer. In a laminating direction of the display panel, the existence of the optical adjustment layer with a certain height enables a reflecting surface of the second base plate to be closer to the first base plate, so that it is hard for backlight light entering from a lateral side of the TFT to reach the reflecting surface, and then the backlight light cannot be reflected to the active layer. As such, a great decline in Ioff of the TFT is avoided, and the image quality is improved.

Figure 8:
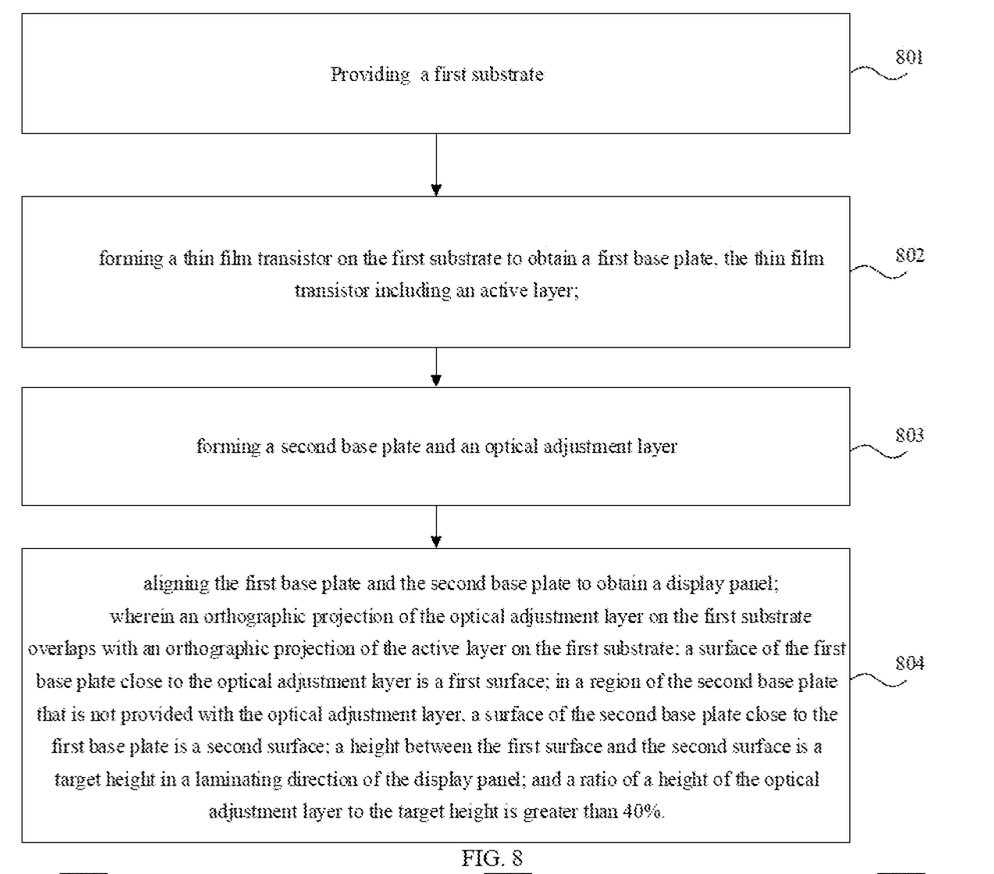
FIG. 8 illustrates a flow chart of steps of a method for manufacturing a display panel according to an embodiment of the present disclosure.

Referring to FIG. 8, a flow chart of steps of a method for manufacturing a display panel according to an embodiment of the present disclosure is illustrated. The method is used for manufacturing the above-mentioned display panel. The method includes the following steps:

In step 801: a first substrate is provided.

Optionally, the first substrate may adopt a glass material.

In step 802: a TFT is formed on the first substrate to obtain a first base plate, and the TFT includes an active layer.

In this step, the active layer, a grid electrode, a source electrode and a drain electrode of the TFT, and a grid insulation layer, a passivation layer and other structures can be formed on the first substrate, thus obtaining the first base plate.

In step 803: a second base plate and an optical adjustment layer are formed.

In one optional implementation, for a COA display panel, this step may specifically include the following steps:
a second substrate is provided;
a black matrix layer is formed on the second substrate; and
a color filter layer and an optical adjustment layer are formed through a masking process, the color filter layer being disposed on the second substrate having the black matrix layer, and the optical adjustment layer being disposed on one side of the black matrix layer away from the second substrate.

Optionally, the color filter layer may be formed by a masking process first, and then the optical adjustment layer may be then formed by the masking process, so as to obtain the color filter layer and the optical adjustment layer as shown in FIG. 3 or FIG. 5. Alternatively, the optical adjustment layer may be formed by a masking process first, and then the color filter layer may be then formed by the masking process, so as to obtain the color filter layer and the optical adjustment layer as shown in FIG. 4 or FIG. 5. In this way, for a display panel in which the color filter layer is formed first and the optical adjustment layer is then formed, there may only be a pixel structure in which the color filter layer is located between the black matrix layer and the optical adjustment layer (as shown in FIG. 3). For a display panel in which the optical adjustment layer is formed first and the color filter layer is then formed, there may only be a pixel structure in which the optical adjustment layer is located between the black matrix layer and the optical adjustment layer (as shown in FIG. 4).

Further optionally, a material of the optical adjustment layer may include a color filter material. The display panel includes a plurality of pixel regions, and the plurality of pixel regions are used for disposing pixel structures in at least two colors.

In this case, the step that the color filter layer and the optical adjustment layer are formed through a masking process may specifically include:
forming, through one mask, a color filter layer in the pixel regions used for disposing pixel structures in one color, and forming an optical adjustment layer in the pixel regions used for disposing pixel structures in at least one other color at a same time.

In one optional specific implementation, for a display panel including red, green and blue pixel structures, color filter layers in the pixel structures in one color and optical adjustment layers in the pixel structures in another color can be formed at a same time through one mask.

Figure 9:
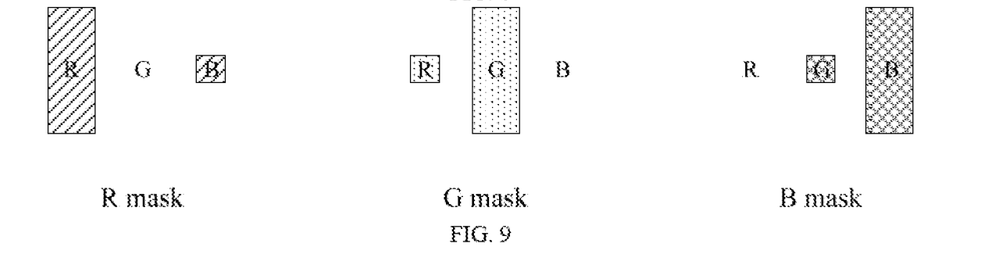
FIG. 9 illustrates a schematic diagram of a pattern of a color filter mask according to an embodiment of the present disclosure.

Exemplarily, through an R mask shown in FIG. 9, an R color filter layer can be formed in the pixel region of the R pixel structure, and an R optical adjustment layer can be formed in the pixel region of the B pixel structure at a same time. Through a G mask shown in FIG. 9, a G color filter layer can be formed in the pixel region of the G pixel structure, and a G optical adjustment layer can be formed in the pixel region of the R pixel structure at a same time. Through a B mask shown in FIG. 9, a B color filter layer can be formed in the pixel region of the B pixel structure, and a B optical adjustment layer can be formed in the pixel region of the G pixel structure. As such, a pixel unit including the R pixel structure, the G pixel structure and the B pixel structure arranged in sequence along the row direction can be obtained. In the pixel unit, the color filter layer 23 is sequentially an R color filter, a G color filter and a B color filter along the row direction, and the optical adjustment layer 40 is sequentially a G color filter, a B color filter and an R color filter along the row direction, as shown in FIG. 7.

The R mask, the G mask and the B mask all need to be improved on the existing basis.

In another optional specific implementation, for a display panel including red, green and blue pixel structures, color filter layers in the pixel structures in a first color and optical adjustment layers in the pixel structures in a second color and a third color can be formed through one mask at a same time. Then, through a second mask, color filter layers in the pixel structures in the second color and optical adjustment layers in the pixel structures in the first color are formed at a same time. So far, the preparation of the optical adjustment layer is completed. Finally, through a third mask, color filter layers in the pixel structures in the third color are formed.

Figure 10:
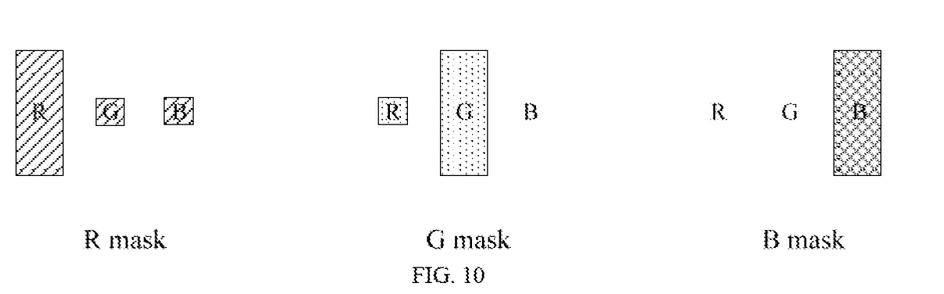
FIG. 10 illustrates a schematic diagram of a pattern of another color filter mask according to an embodiment of the present disclosure.

Exemplarily, through an R mask shown in FIG. 10, an R color filter layer can be formed in the pixel region of the R pixel structure, and R optical adjustment layers can be formed in the pixel regions of the G pixel structure and the B pixel structure at a same time. Through a G mask shown in FIG. 10, a G color filter layer can be formed in the pixel region of the G pixel structure, and a G optical adjustment layer can be formed in the pixel region of the R pixel structure at a same time. So far, the preparation of the optical adjustment layer is completed. A B color filter layer can be formed in the pixel region of the B pixel structure through a B mask shown in FIG. 10. As such, a pixel unit including the R pixel structure, the G pixel structure and the B pixel structure arranged in sequence along the row direction can be obtained. In the pixel unit, the color filter layer 23 is sequentially an R color filter, a G color filter and a B color filter along the row direction, and the optical adjustment layer 40 is sequentially a G color filter, an R color filter and an R color filter along the row direction. In this pixel unit, the color filter materials of the optical adjustment layers of two adjacent pixel structures have the same color.

The R mask and the G mask need to be improved on the existing basis, but the B mask does not need to be improved.

It should be noted that, in the above two examples, the color filter layers in different colors are prepared in sequence. Correspondingly, the optical adjustment layers are also prepared by at least two masking processes along with a preparation order of the color filter layers. Therefore, for the display panels obtained by the above two examples, in the same pixel structure, the optical adjustment layer may be prepared before the color filter layer is prepared, or may be prepared after the color filter layer is prepared. For one pixel structure, if the optical adjustment layer therein is prepared before the color filter layer is prepared, a cross section of the pixel structure can refer to FIG. 3 or FIG. 5. If the optical adjustment layer therein is prepared after the color filter layer is prepared, a cross section of the pixel structure can refer to FIG. 4 or FIG. 5. As such, for the display panels obtained by the above two examples, there may be both the pixel structure in which the color filter layer is located between the black matrix layer and the optical adjustment layer (as shown in FIG. 3) and the pixel structure where the optical adjustment layer is located between the black matrix layer and the color filter layer (as shown in FIG. 4).

It can be understood that in the same pixel region, the color filter layer and the optical adjustment layer can be in different colors. In practical applications, in the same masking process, a color combination of the color filter layer and the optical adjustment layer, the preparation order of the color filter layers in different colors and color filter mask patterns in different colors are selected or adjusted as required. All the above examples do not constitute a limitation to the present disclosure.

In step 804: the first base plate and the second base plate are aligned with each other to obtain a display panel. An orthographic projection of the optical adjustment layer on the first substrate overlaps with an orthographic projection of the active layer on the first substrate; a surface of the first base plate close to the optical adjustment layer is a first surface; in a region of the second base plate that is not provided with the optical adjustment layer, a surface of the second base plate close to the first base plate is a second surface; in a laminating direction of the display panel, a height between the first surface and the second surface is a target height of the display panel; and a ratio of a height of the optical adjustment layer to the target height is greater than 40%.

After the second base plate and the optical adjustment layer are formed, steps such as liquid crystal filling can be performed, and then the first base plate and the second base plate are aligned to obtain the display panel.

In addition, the method may further include conventional steps such as forming an orientation layer, which are not specifically limited in the embodiment of the present disclosure.

In the embodiment of the present disclosure, an optical adjustment layer is disposed on the second base plate, and the optical adjustment layer corresponds to the active layer. In a laminating direction of the display panel, the existence of the optical adjustment layer with a certain height enables a reflecting surface of the second base plate to be closer to the first base plate, so that it is hard for backlight light entering from a lateral side of the TFT to reach the reflecting surface, and then the backlight light cannot be reflected to the active layer. As such, a great decline in Ioff of the TFT is avoided, and the image quality is improved.

An embodiment of the present disclosure further discloses a display apparatus, including the above-mentioned display panel 100.

On the basis of the display panel 100 shown in FIG. 3 to FIG. 6, the display apparatus may further include a backlight module 50. The backlight module 50 may be disposed on one side of the first base plate 10 away from the second base plate 20.

In the embodiment of the present disclosure, an optical adjustment layer is disposed on the second base plate, and the optical adjustment layer corresponds to the active layer. In a laminating direction of the display panel, the existence of the optical adjustment layer with a certain height enables a reflecting surface of the second base plate to be closer to the first base plate, so that it is hard for backlight light entering from a lateral side of the TFT to reach the reflecting surface, and then the backlight light cannot be reflected to the active layer. As such, a great decline in Ioff of the TFT is avoided, and the image quality is improved.

"One embodiment," "an embodiment," or "one or more embodiments" herein means that a particular feature, structure, or characteristic described in connection with the embodiment is included in at least one embodiment of the present disclosure. In addition, it is noted that phrase examples "in one embodiment" here are not necessarily all referring to the same embodiment.

Numerous specific details are set forth in the specification provided here. It can be understood, however, that the embodiments of the present disclosure may be practiced without these specific details. In some instances, well-known methods, structures and techniques have not been shown in detail in order not to obscure an understanding of this specification.

In the claims, any reference signs placed in parentheses shall not be construed as limiting the claims. The word "include" does not exclude the presence of elements or steps not listed in a claim. The word "a/an" or "one" in front of an element does not preclude the presence of a plurality of such elements. The present disclosure can be implemented by means of hardware including several different elements and by means of a suitably programmed computer. In the unit claims enumerating several apparatuses, several of these apparatuses can be specifically embodied by the same hardware. Use of words first, second and third does not denote any order. These words can be explained as names.

It should be finally noted that: the above embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some of the technical features, and these modifications or replacements do not depart the essences of the corresponding technical solutions from the spirit and scope of the technical solutions of all the embodiments of the present disclosure.

The invention claimed is:

1. A display panel, comprising a first base plate and a second base plate which are aligned with each other, wherein the first base plate comprises a first substrate and a thin film transistor; the thin film transistor comprises an active layer; the second base plate comprises a second substrate;
   an optical adjustment layer is arranged on the second base plate; the optical adjustment layer is located between the second substrate and the first base plate; an orthographic projection of the optical adjustment layer on the first substrate overlaps with an orthographic projection of the active layer on the first substrate; and
   a surface of the first base plate close to the optical adjustment layer is a first surface; in a region of the second base plate that is not provided with the optical adjustment layer, a surface of the second base plate close to the first base plate is a second surface; in a laminating direction of the display panel, a height between the first surface and the second surface is a target height; and a ratio of a height of the optical adjustment layer to the target height is greater than 40% and less than 100%;
   wherein a material of the optical adjustment layer comprises a color filter material;
   the second base plate further comprises a color filter layer;
   the color filter layer is located on one side of the second substrate close to the first base plate; and
   the display panel comprises a plurality of pixel structures; and in a same pixel structure, the color filter layer and the optical adjustment layer adopt color filter materials in different colors.

2. The display panel according to claim 1, wherein a transmittance of the optical adjustment layer is greater than or equal to 5% and less than or equal to 70%.

3. The display panel according to claim 1, wherein the second base plate further comprises a black matrix layer; the black matrix layer is located on one side of the second substrate close to the first base plate; and the optical adjustment layer is located on one side of the black matrix layer away from the second substrate.

4. The display panel according to claim 3, wherein an orthographic projection of the color filter layer on the second substrate and an orthographic projection of the black matrix layer on the second substrate have an overlapping region; and the optical adjustment layer is located in the overlapping region.

5. The display panel according to claim 4, wherein in the overlapping region, the color filter layer is located between the black matrix layer and the optical adjustment layer.

6. The display panel according to claim 4, wherein in the overlapping region, the optical adjustment layer is located between the black matrix layer and the color filter layer.

7. The display panel according to claim 3, wherein an orthographic projection of the color filter layer on the second substrate does not overlap with an orthographic projection of the black matrix layer on the second substrate; and the optical adjustment layer is disposed on one side of the black matrix layer away from the second substrate.

8. The display panel according to claim 1, wherein the first base plate comprises a black matrix layer and a color filter layer; and the optical adjustment layer is disposed on one side of the second substrate close to the first base plate.

9. The display panel according to claim 1, wherein on a plane parallel to the first substrate, a ratio of an outer diameter of the optical adjustment layer to an outer diameter of the active layer is greater than 50%.

10. The display panel according to claim 1, wherein in the laminating direction of the display panel, the height of the optical adjustment layer is greater than or equal to 1 μm and less than or equal to 2.6 μm.

11. A method for manufacturing a display panel, which is used for manufacturing the display panel according to claim 1, and the method comprises:
    providing the first substrate;
    forming the thin film transistor on the first substrate to obtain the first base plate, the thin film transistor comprising the active layer;
    forming the second base plate and the optical adjustment layer;
    aligning the first base plate and the second base plate to obtain the display panel.

12. The method according to claim 11, wherein the step of forming the second base plate and the optical adjustment layer comprises:
    providing a second substrate;
    forming a black matrix layer on the second substrate; and
    forming the color filter layer and an optical adjustment layer through a masking process, the color filter layer being disposed on the second substrate having the black matrix layer, and the optical adjustment layer being disposed on one side of the black matrix layer away from the second substrate.

13. The method according to claim 12, wherein the display panel comprises a plurality of pixel regions; the plurality of pixel regions are used for disposing pixel structures in at least two colors;

the step of forming the color filter layer and an optical adjustment process through a masking process comprises:

forming, through one mask, the color filter layer in the pixel regions used for disposing pixel structures in one color, and forming an optical adjustment layer in the pixel regions used for disposing pixel structures in at least one other color at a same time.

14. A display apparatus, comprising the display panel according to claim 1.

15. The display apparatus according to claim 14, wherein a transmittance of the optical adjustment layer is greater than or equal to 5% and less than or equal to 70%.

16. The display apparatus according to claim 14, wherein the second base plate further comprises a black matrix layer the color filter layer is located on one side of the second substrate close to the first base plate; and the optical adjustment layer is located on one side of the black matrix layer away from the second substrate.

17. The display panel according to claim 16, wherein an orthographic projection of the color filter layer on the second substrate and an orthographic projection of the black matrix layer on the second substrate have an overlapping region; and the optical adjustment layer is located in the overlapping region.

18. The display panel according to claim 17, wherein in the overlapping region, the color filter layer is located between the black matrix layer and the optical adjustment layer.

\* \* \* \* \*